US011722461B2

(12) United States Patent
Frost et al.

(10) Patent No.: US 11,722,461 B2
(45) Date of Patent: *Aug. 8, 2023

(54) CONNECTING CLIENT DEVICES TO ANONYMOUS SESSIONS VIA HELPERS

(71) Applicant: Citrix Systems, Inc., Fort Lauderdale, FL (US)

(72) Inventors: Simon Frost, Hitchin (GB); William Thomas George Charnell, Great Missenden (GB); Andrew Innes, Milton (GB)

(73) Assignee: Citrix Systems, Inc., Fort Lauderdale, FL (US)

( * ) Notice: Subject to any disclaimer, the term of this patent is extended or adjusted under 35 U.S.C. 154(b) by 143 days.

This patent is subject to a terminal disclaimer.

(21) Appl. No.: 17/081,406

(22) Filed: Oct. 27, 2020

(65) Prior Publication Data

US 2021/0092101 A1 Mar. 25, 2021

Related U.S. Application Data

(63) Continuation of application No. 15/976,980, filed on May 11, 2018, now Pat. No. 10,887,287.

(51) Int. Cl.
*H04L 29/06* (2006.01)
*H04L 9/40* (2022.01)

(52) U.S. Cl.
CPC .......... *H04L 63/0421* (2013.01); *H04L 63/08* (2013.01); *H04L 63/108* (2013.01)

(58) Field of Classification Search
CPC ... H04L 63/0421; H04L 63/08; H04L 63/108; H04L 9/32; H04L 63/0407; H04L 63/10; H04W 12/06
See application file for complete search history.

(56) References Cited

U.S. PATENT DOCUMENTS 9,792,426 B1 * 10/2017 Driscoll ................. G06F 21/62
2004/0006625 A1    1/2004 Saha et al.
(Continued)

FOREIGN PATENT DOCUMENTS

JP    2008-186358 A    8/2008
JP    2014-531670 A    11/2014
(Continued)

OTHER PUBLICATIONS

Erdin et al, How to Find Hidden Users: A Survey of Attacks on Anonymity Networks, Jul. 8, 2015, IEEE, pp. 2296-2316. (Year: 2015).*

(Continued)

*Primary Examiner* — Luu T Pham
*Assistant Examiner* — Jenise E Jackson

(57) ABSTRACT

Methods and systems for connecting client devices to anonymous sessions via helpers are described herein. One or more anonymous sessions may be generated on one or more target machines. Configuration information for generating an anonymous session may be used to initiate generation of the anonymous session on a target machine. A helper process may be created and associated with the anonymous session. A request to start a virtual application or desktop may be received from a client device, and the client device may be connected to the anonymous session on the target machine. The helper associated with the anonymous session may retrieve credentials associated with a user of the client device and/or may use the credentials associated with the user to start the virtual application or desktop on the target machine as the user.

21 Claims, 8 Drawing Sheets

(56) References Cited

U.S. PATENT DOCUMENTS

| | | | |
|---|---|---|---|
| 2006/0123119 A1* | 6/2006 | Hill | H04L 67/145 709/227 |
| 2006/0230438 A1* | 10/2006 | Shappir | H04L 63/0815 726/8 |
| 2007/0061460 A1* | 3/2007 | Khan | H04L 63/029 709/225 |
| 2008/0244718 A1* | 10/2008 | Frost | G06F 21/31 726/8 |
| 2011/0169182 A1 | 7/2011 | Piascik et al. | |
| 2012/0185925 A1* | 7/2012 | Barkie | H04L 41/0806 726/7 |
| 2016/0065563 A1* | 3/2016 | Broadbent | H04L 63/0281 726/9 |
| 2018/0139238 A1* | 5/2018 | Schultz | H04L 63/1491 |
| 2019/0245848 A1* | 8/2019 | Divoux | H04L 63/0815 |
| 2019/0317792 A1* | 10/2019 | Jackson | H04L 63/205 |

FOREIGN PATENT DOCUMENTS

| | | |
|---|---|---|
| JP | 2016-519817 A | 7/2016 |
| JP | 2017-169182 A | 9/2017 |
| JP | 2017-535843 A | 11/2017 |

OTHER PUBLICATIONS

Schmidt, Subscriptionless Mobile Networking: Anonymity and Privacy Aspects within Personal Area Networks, Mar. 21, 2002, IEEE, pp. 869-875. (Year: 2002).*
"Runas" Microsoft 2018 https://technet.microsoft.com/en-us/library/bb490994.aspx, website visited Jan. 31, 2018, pates 1-3.
"LsaApLogonUserEx2 function" Microsoft 2018 https://msdn.microsoft.com/en-us/library/windows/desktop/aa378257(v=vs.85).aspx website visited Jan. 29, 2018, pp. 1-5.
Jul. 22, 2021—Examination report No. 1 for standard patent application—AU 2019266127.
Jan. 27, 2022—Decision to Grant a Patent received in JP Application No. 2021-513361.

* cited by examiner

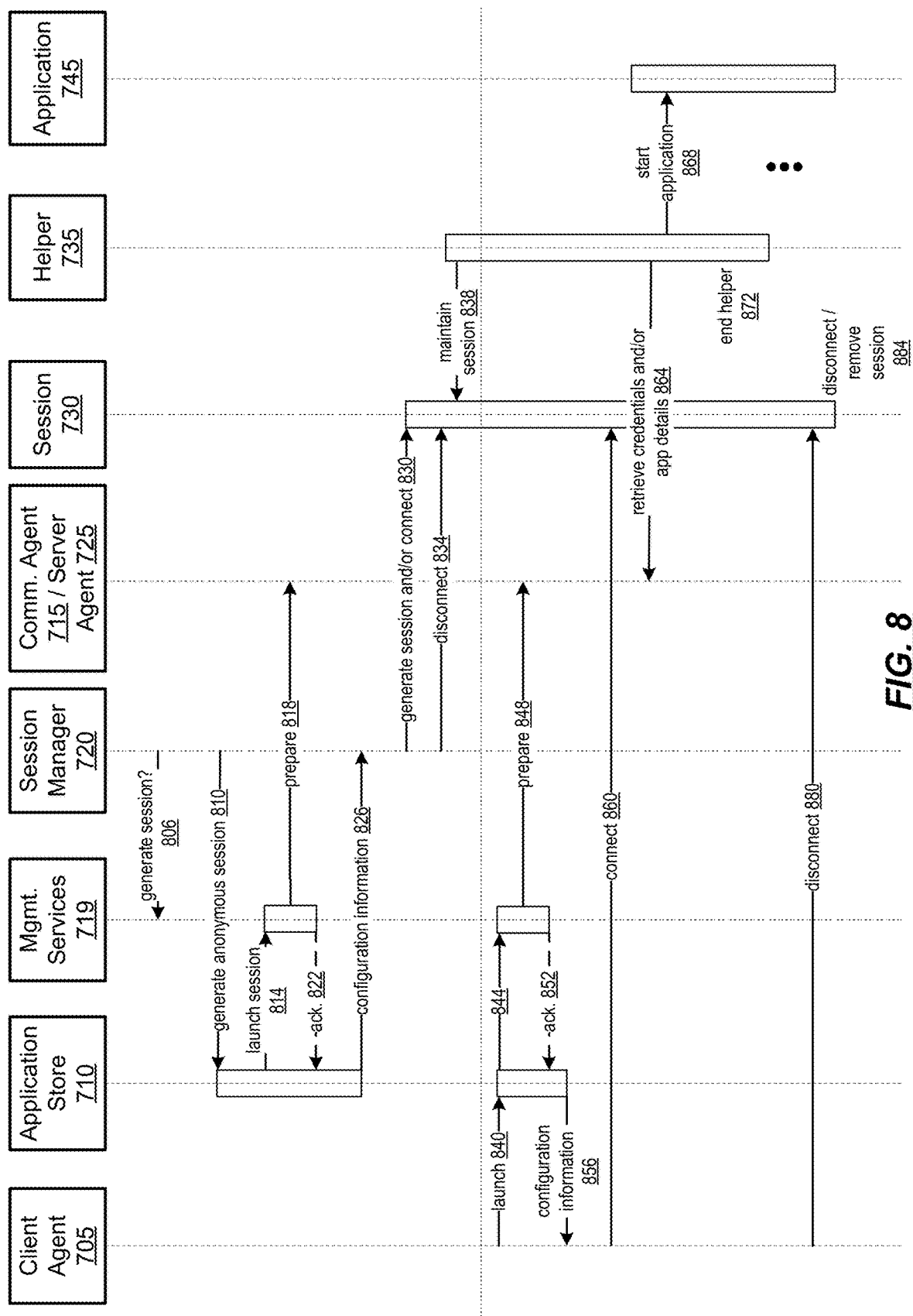

CONNECTING CLIENT DEVICES TO ANONYMOUS SESSIONS VIA HELPERS

CROSS-REFERENCE TO RELATED APPLICATIONS

This application is a continuation of U.S. patent application Ser. No. 15/976,980, filed May 11, 2018, entitled "CONNECTING CLIENT DEVICES TO ANONYMOUS SESSIONS VIA HELPERS." The prior application is herein incorporated by reference in its entirety for all purposes.

FIELD

Aspects described herein generally relate to computer networking and data security. More specifically, aspects described herein relate to generating anonymous sessions that may be used by client devices to access network resources.

BACKGROUND

End users may desire quick access to virtual desktops and/or virtual applications, which may run on virtual machines. However, there may be a delay between when the user requests access to when the user is actually able to access the virtual desktop and/or application because of the time needed to generate a session and connect the user to the session. Generating a session may be time consuming, especially if the session is generated from scratch. User-specific sessions may be launched before the user requests a session. However, user-specific pre-launches may waste computing resources if that particular user decides not to access the virtual desktop and/or application or waits an extended amount of time before requesting access. Moreover, if a pre-launch event does not precede a user launch request by a certain amount of time, there may still be an undesirable delay.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Methods and systems for connecting client device(s) to anonymous session(s) via helper(s) are described herein. A computing device may determine to generate an anonymous session, and the computing device may send a request to generate the anonymous session. Based on the request, the computing device may receive configuration information for generating the anonymous session. Based on the configuration information, the computing device may send a request to initiate generation of the anonymous session on a target machine. The request to initiate generation of the anonymous session may include a request to initiate an anonymous helper associated with the anonymous session.

A request to start an application may be received from a client device. Based on receiving the request to start the application, the client device may be connected to the anonymous session on the target machine. The anonymous helper associated with the anonymous session may retrieve credentials associated with a user of the client device. The anonymous helper may use the credentials associated with the user to start the application on the target machine as the user.

In some examples, determining to generate the anonymous session may be based on a determination that a number of anonymous sessions in a pool of anonymous sessions is below a threshold number of anonymous sessions. A request to initiate generation of the anonymous session on the target machine may comprise connecting, by the computing device, to the anonymous session on the target machine. After an amount of time, the computing device may be disconnected from the anonymous session on the target machine. Connecting the client device to the anonymous session on the target machine may be performed after disconnecting the computing device from the anonymous session.

In some examples, after starting the application on the target machine as the user, a method described herein may comprise ending the anonymous helper associated with the anonymous session. Additionally or alternatively, the method may comprise receiving, from the client device, a request to disconnect from the anonymous session (e.g., after starting the application on the target machine as the user). In response to receiving the request to disconnect, the client device may be disconnected from the anonymous session. The anonymous session may also be removed from the target machine.

In some examples, starting the application on the target machine as the user may comprise associating, based on a retrieved user profile, user configuration parameters with the application on the target machine. In some examples, a plurality of anonymous sessions may be on the target machine, and each of the plurality of anonymous sessions may be associated with an anonymous helper. Connecting the client device to the anonymous session on the target machine may be based on one or more of a location of the client device, an indication of a network that the client device is connected to, processor characteristics of the target machine, and/or memory characteristics of the target machine. In some examples, after initiating generation of the anonymous session on the target machine, the anonymous session may be kept alive on the target machine for a period of time, such as by the anonymous helper.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein:

FIG. 8 depicts another illustrative system and method for connecting client devices to anonymous sessions via helpers in accordance with one or more illustrative aspects described herein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Figure 1:
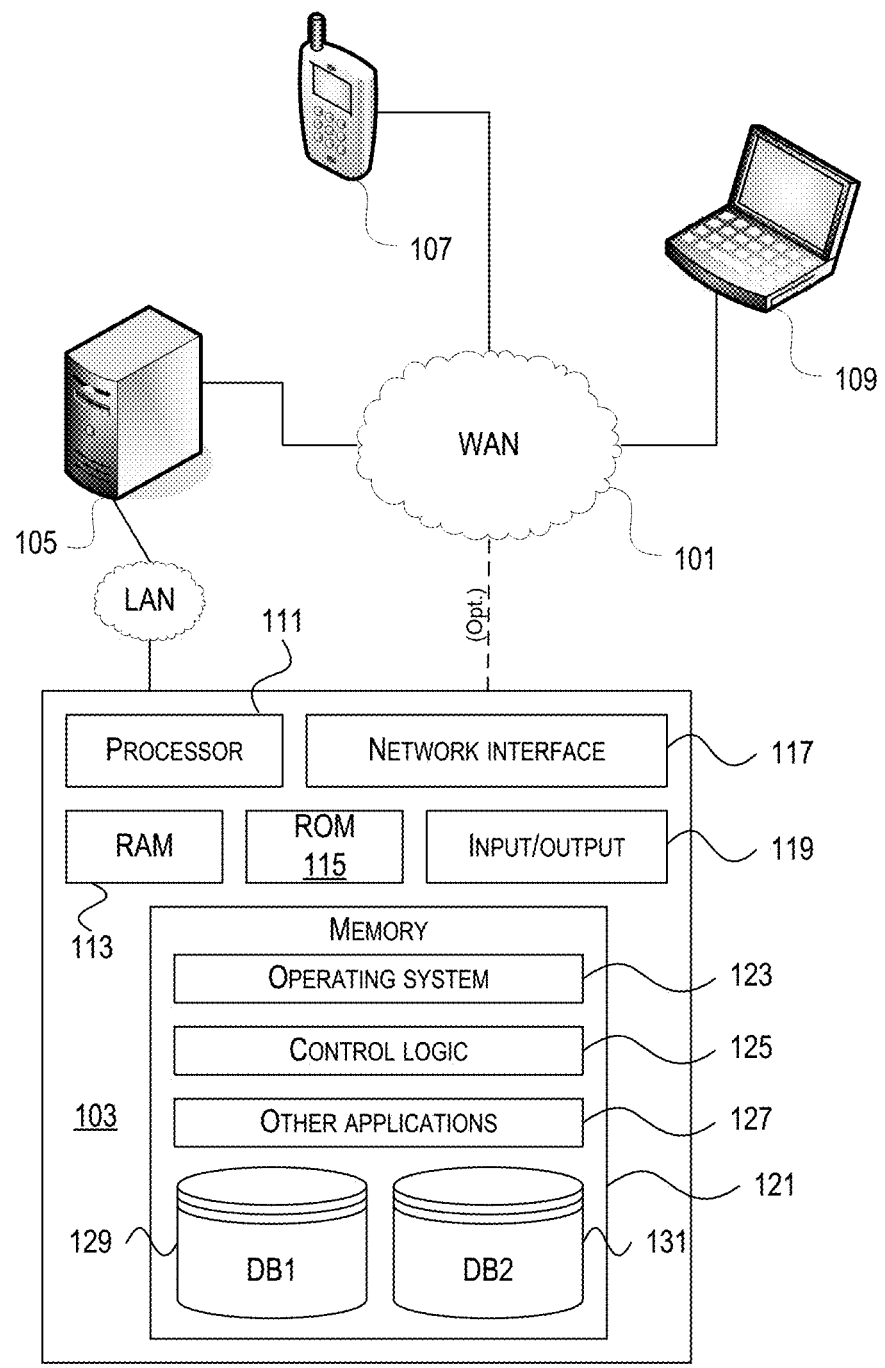
FIG. 1 depicts an illustrative computer system architecture that may be used in accordance with one or more illustrative aspects described herein.

Computer software, hardware, and networks may be utilized in a variety of different system environments, including standalone, networked, remote-access (also known as, remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, LANs, metropolitan area networks (MAN) wireless networks, personal networks (PAN), and the like. Network 101 is for illustration purposes and may be replaced with fewer or additional computer networks. A local area network (LAN) may have one or more of any known LAN topology and may use one or more of a variety of different protocols, such as Ethernet. Devices 103, 105, 107, 109 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data-attributable to a single entity-which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, 109 may have similar or different architecture as described with respect to device 103. Those of skill in the art will appreciate that the functionality of data processing device 103 (or device 105, 107, 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
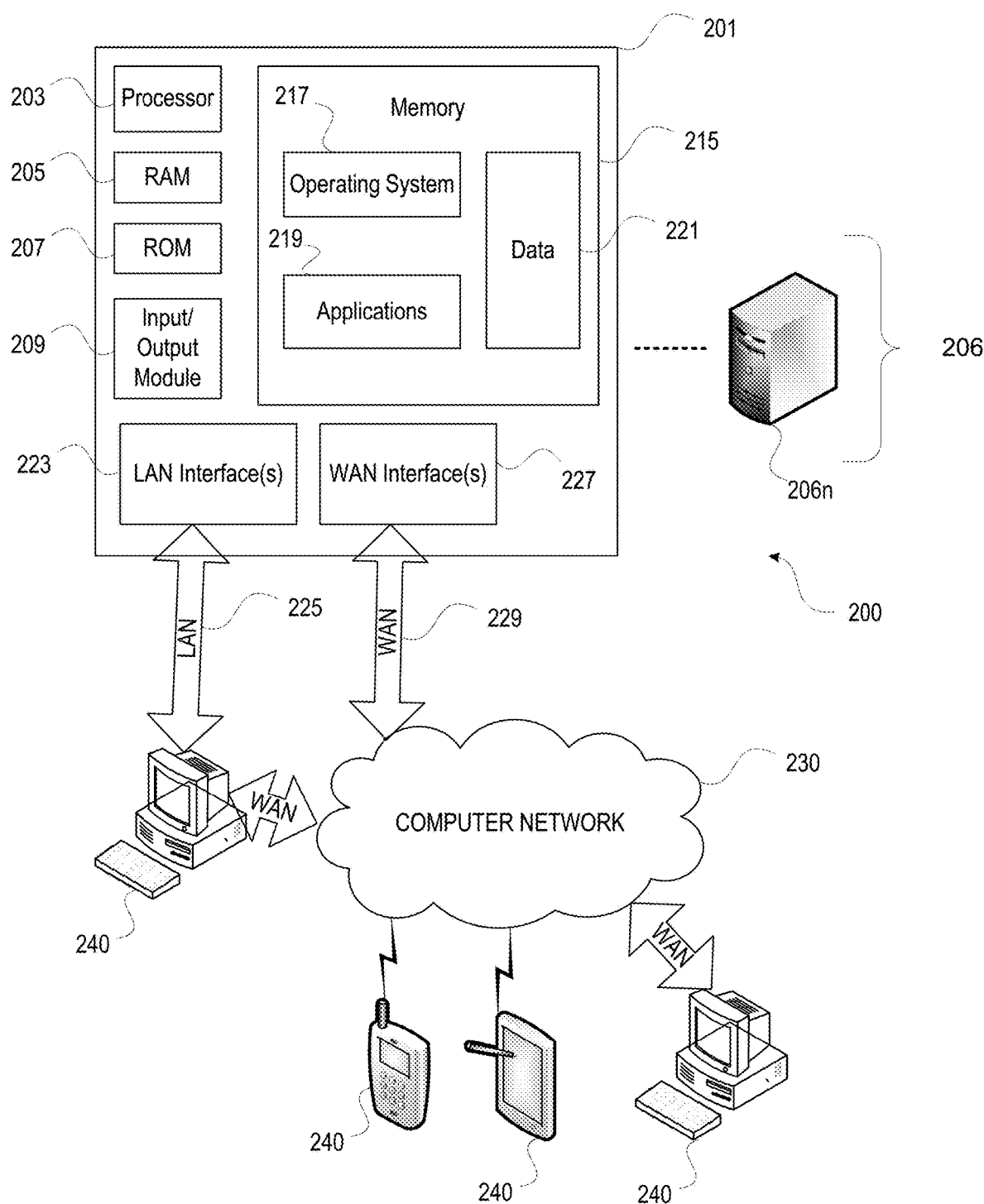
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a generic computing device 201 in an illustrative computing environment 200 that may be used according to one or more illustrative aspects described herein. Generic computing device 201 may be used as a server 206a in a single-server or multi-server desktop virtualization system (e.g., a remote access or cloud system) configured to provide virtual machines for client access devices. The generic computing device 201 may have a processor 203 for controlling overall operation of the server and its associated components, including RAM 205, ROM 207, I/O module 209, and memory 215.

I/O module 209 may include a mouse, keypad, touch screen, scanner, optical reader, and/or stylus (or other input device(s)) through which a user of generic computing device 201 may provide input, and may also include one or more of a speaker for providing audio output and a video display device for providing textual, audiovisual, and/or graphical output. Software may be stored within memory 215 and/or other storage to provide instructions to processor 203 for configuring generic computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the generic computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem 227 or other wide area network interface for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while and logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b, and responds to the request generated by the client machine 240 with a response from the second server 206b. First server 206a may acquire an enumeration of applications available to the client machine 240 and well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

FIG. 2 shows a high-level architecture of an illustrative desktop virtualization system. As shown, the desktop virtualization system may be single-server or multi-server system, or cloud system, including at least one virtualization server 206 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

Figure 3:
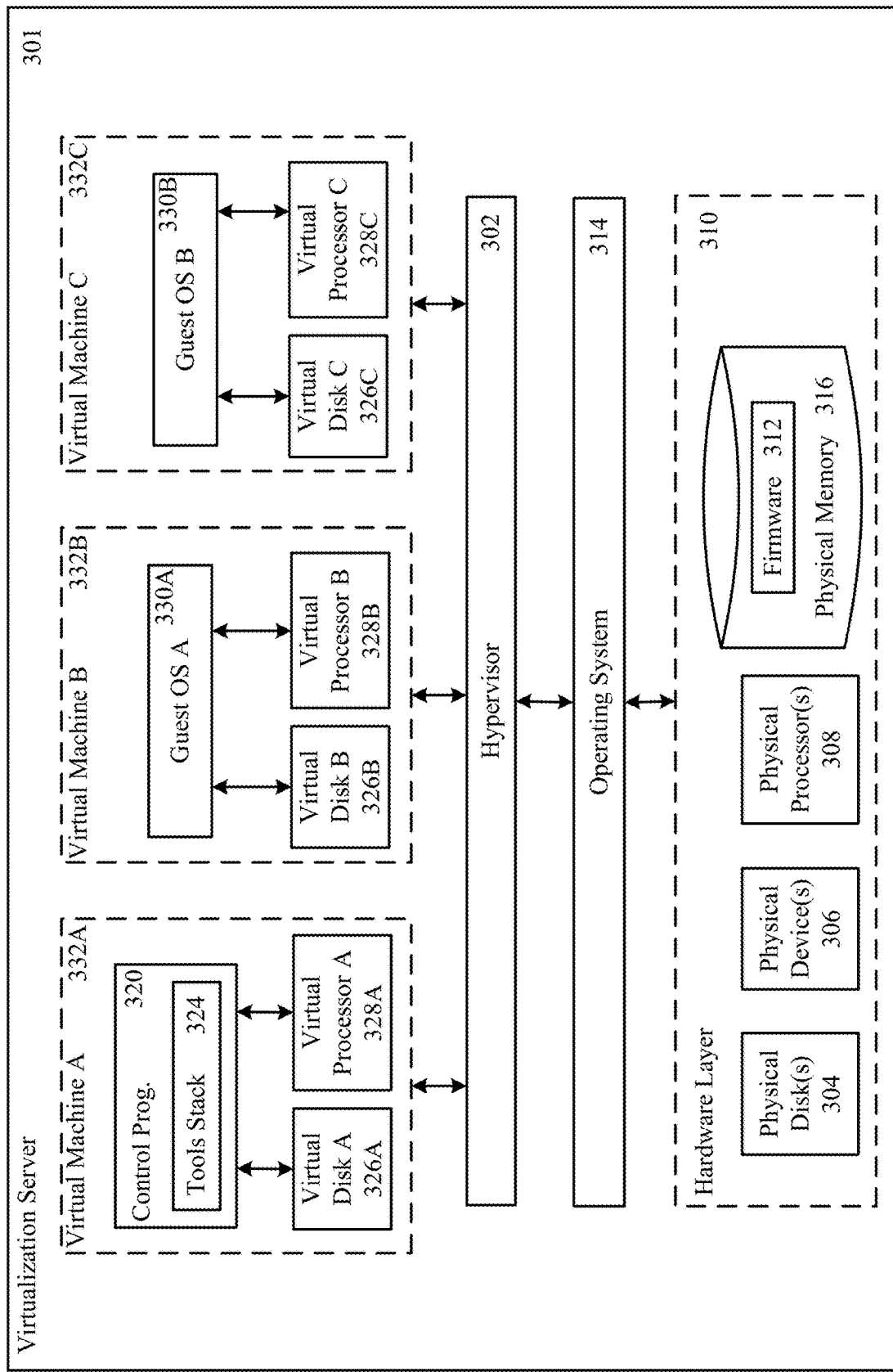
FIG. 3 depicts an illustrative virtualized (hypervisor) system architecture that may be used in accordance with one or more illustrative aspects described herein.

With further reference to FIG. 3, a computer device 301 may be configured as a virtualization server in a virtualization environment, for example, a single-server, multi-server, or cloud-computing environment. Virtualization server 301 illustrated in FIG. 3 can be deployed as and/or implemented by one or more embodiments of the server 206 illustrated in FIG. 2 or by other known computing devices. Included in virtualization server 301 is a hardware layer that can include one or more physical disks 304, one or more physical devices 306, one or more physical processors 308 and one or more physical memories 316. In some embodiments, firmware 312 can be stored within a memory element in the physical memory 316 and can be executed by one or more of the physical processors 308. Virtualization server 301 may further include an operating system 314 that may be stored in a memory element in the physical memory 316 and executed by one or more of the physical processors 308. Still further, a hypervisor 302 may be stored in a memory element in the physical memory 316 and can be executed by one or more of the physical processors 308.

Executing on one or more of the physical processors 308 may be one or more virtual machines 332A-C (generally 332). Each virtual machine 332 may have a virtual disk 326A-C and a virtual processor 328A-C. In some embodiments, a first virtual machine 332A may execute, using a virtual processor 328A, a control program 320 that includes a tools stack 324. Control program 320 may be referred to as a control virtual machine, Dom0, Domain 0, or other virtual machine used for system administration and/or control. In some embodiments, one or more virtual machines 332B-C can execute, using a virtual processor 328B-C, a guest operating system 330A-B.

Virtualization server 301 may include a hardware layer 310 with one or more pieces of hardware that communicate with the virtualization server 301. In some embodiments, the hardware layer 310 can include one or more physical disks 304, one or more physical devices 306, one or more physical processors 308, and one or more memory 316. Physical components 304, 306, 308, and 316 may include, for example, any of the components described above. Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in the hardware layer 310 may include any type of memory. Physical memory 316 may store data, and in some embodiments may store one or more programs, or set of executable instructions. FIG. 3 illustrates an embodiment where firmware 312 is stored within the physical memory 316 of virtualization server 301. Programs or executable instructions stored in the physical memory 316 can be executed by the one or more processors 308 of virtualization server 301.

Virtualization server 301 may also include a hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 can be any combination of executable instructions and hardware that monitors virtual machines executing on a computing machine. Hypervisor 302 may be Type 2 hypervisor, where the hypervisor that executes within an operating system 314 executing on the virtualization server 301. Virtual machines then execute at a level above the hypervisor. In some embodiments, the Type 2 hypervisor executes within the context of a user's operating system such that the Type 2 hypervisor interacts with the user's operating system. In other embodiments, one or more virtualization servers 301 in a virtualization environment may instead include a Type 1 hypervisor (not shown). A Type 1 hypervisor may execute on the virtualization server 301 by directly accessing the hardware and resources within the hardware layer 310. That is, while a Type 2 hypervisor 302 accesses system resources through a host operating system 314, as shown, a Type 1 hypervisor may directly access all system resources without the host operating system 314. A Type 1 hypervisor may execute directly on one or more physical processors 308 of virtualization server 301, and may include program data stored in the physical memory 316.

Hypervisor 302, in some embodiments, can provide virtual resources to operating systems 330 or control programs 320 executing on virtual machines 332 in any manner that simulates the operating systems 330 or control programs 320 having direct access to system resources. System resources can include, but are not limited to, physical devices 306, physical disks 304, physical processors 308, physical memory 316 and any other component included in virtualization server 301 hardware layer 310. Hypervisor 302 may be used to emulate virtual hardware, partition physical hardware, virtualize physical hardware, and/or execute virtual machines that provide access to computing environments. In still other embodiments, hypervisor 302 controls processor scheduling and memory partitioning for a virtual machine 332 executing on virtualization server 301. Hypervisor 302 may include those manufactured by VMWare, Inc., of Palo Alto, Calif.; the XEN hypervisor, an open source product whose development is overseen by the open source Xen.org community; HyperV, VirtualServer or virtual PC hypervisors provided by Microsoft, or others. In some embodiments, virtualization server 301 executes a hypervisor 302 that creates a virtual machine platform on which guest operating systems may execute. In these embodiments, the virtualization server 301 may be referred to as a host server. An example of such a virtualization server is the XEN SERVER provided by Citrix Systems, Inc., of Fort Lauderdale, Fla.

Hypervisor 302 may create one or more virtual machines 332B-C (generally 332) in which guest operating systems 330 execute. In some embodiments, hypervisor 302 may load a virtual machine image to create a virtual machine 332. In other embodiments, the hypervisor 302 may executes a guest operating system 330 within virtual machine 332. In still other embodiments, virtual machine 332 may execute guest operating system 330.

In addition to creating virtual machines 332, hypervisor 302 may control the execution of at least one virtual machine 332. In other embodiments, hypervisor 302 may presents at least one virtual machine 332 with an abstraction of at least one hardware resource provided by the virtualization server 301 (e.g., any hardware resource available within the hardware layer 310). In other embodiments, hypervisor 302 may control the manner in which virtual machines 332 access physical processors 308 available in virtualization server 301. Controlling access to physical processors 308 may include determining whether a virtual machine 332 should have access to a processor 308, and how physical processor capabilities are presented to the virtual machine 332.

As shown in FIG. 3, virtualization server 301 may host or execute one or more virtual machines 332. A virtual machine 332 is a set of executable instructions that, when executed by a processor 308, imitate the operation of a physical computer such that the virtual machine 332 can execute programs and processes much like a physical computing device. While FIG. 3 illustrates an embodiment where a virtualization server 301 hosts three virtual machines 332, in other embodiments virtualization server 301 can host any number of virtual machines 332. Hypervisor 302, in some embodiments, provides each virtual machine 332 with a unique virtual view of the physical hardware, memory, processor and other system resources available to that virtual machine 332. In some embodiments, the unique virtual view can be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor and other system resources available to the virtual machines 332.

Each virtual machine 332 may include a virtual disk 326A-C (generally 326) and a virtual processor 328A-C (generally 328.) The virtual disk 326, in some embodiments, is a virtualized view of one or more physical disks 304 of the virtualization server 301, or a portion of one or more physical disks 304 of the virtualization server 301. The virtualized view of the physical disks 304 can be generated, provided and managed by the hypervisor 302. In some embodiments, hypervisor 302 provides each virtual machine 332 with a unique view of the physical disks 304. Thus, in these embodiments, the particular virtual disk 326 included in each virtual machine 332 can be unique when compared with the other virtual disks 326.

A virtual processor 328 can be a virtualized view of one or more physical processors 308 of the virtualization server 301. In some embodiments, the virtualized view of the physical processors 308 can be generated, provided and managed by hypervisor 302. In some embodiments, virtual processor 328 has substantially all of the same characteristics of at least one physical processor 308. In other embodiments, virtual processor 308 provides a modified view of physical processors 308 such that at least some of the characteristics of the virtual processor 328 are different than the characteristics of the corresponding physical processor 308.

Figure 4:
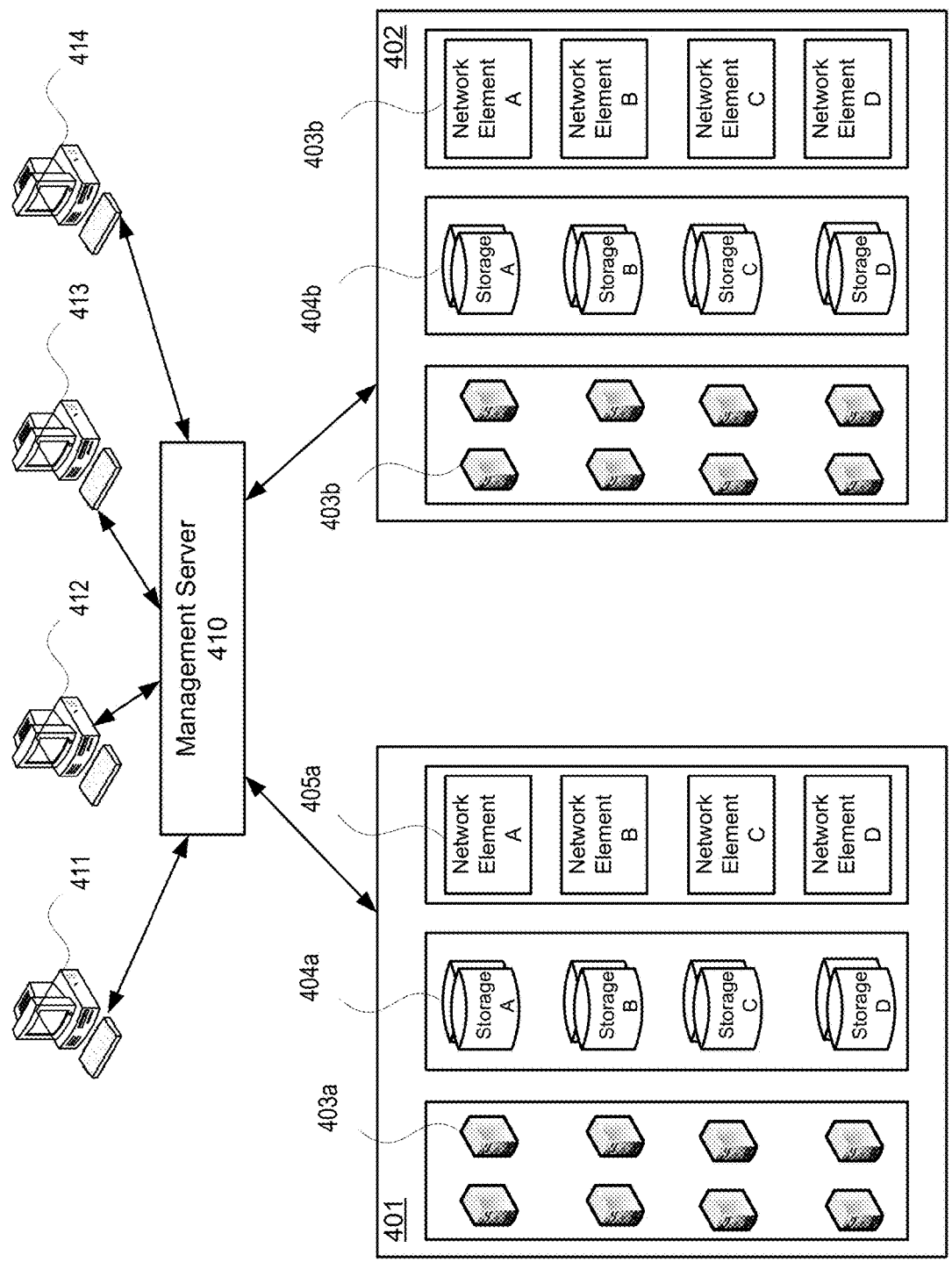
FIG. 4 depicts an illustrative cloud-based system architecture that may be used in accordance with one or more illustrative aspects described herein.

With further reference to FIG. 4, some aspects described herein may be implemented in a cloud-based environment. FIG. 4 illustrates an example of a cloud computing environment (or cloud system) 400. As seen in FIG. 4, client computers 411-414 may communicate with a cloud management server 410 to access the computing resources (e.g., host servers 403, storage resources 404, and network resources 405) of the cloud system.

Management server 410 may be implemented on one or more physical servers. The management server 410 may run, for example, CLOUDSTACK, or OPENSTACK, among others. Management server 410 may manage various computing resources, including cloud hardware and software resources, for example, host computers 403, data storage devices 404, and networking devices 405. The cloud hardware and software resources may include private and/or public components. For example, a cloud may be configured as a private cloud to be used by one or more particular customers or client computers 411-414 and/or over a private network. In other embodiments, public clouds or hybrid public-private clouds may be used by other customers over an open or hybrid networks.

Management server 410 may be configured to provide user interfaces through which cloud operators and cloud customers may interact with the cloud system. For example, the management server 410 may provide a set of application programming interfaces (APIs) and/or one or more cloud operator console applications (e.g., web-based on standalone applications) with user interfaces to allow cloud operators to manage the cloud resources, configure the virtualization layer, manage customer accounts, and perform other cloud administration tasks. The management server 410 also may include a set of APIs and/or one or more customer console applications with user interfaces configured to receive cloud computing requests from end users via client computers 411-414, for example, requests to create, modify, or destroy virtual machines within the cloud. Client computers 411-414 may connect to management server 410 via the Internet or other communication network, and may request access to one or more of the computing resources managed by management server 410. In response to client requests, the management server 410 may include a resource manager configured to select and provision physical resources in the hardware layer of the cloud system based on the client requests. For example, the management server 410 and additional components of the cloud system may be configured to provision, create, and manage virtual machines and their operating environments (e.g., hypervisors, storage resources, services offered by the network elements, etc.) for customers at client computers 411-414, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 411-414 may be related, for example, different client computers creating virtual machines on behalf of the same end user, or different users affiliated with the same company or organization. In other examples, certain clients 411-414 may be unrelated, such as users affiliated with different companies or organizations. For unrelated clients, information on the virtual machines or storage of any one user may be hidden from other users.

Referring now to the physical hardware layer of a cloud computing environment, availability zones 401-402 (or zones) may refer to a collocated set of physical computing resources. Zones may be geographically separated from other zones in the overall cloud of computing resources. For example, zone 401 may be a first cloud datacenter located in California, and zone 402 may be a second cloud datacenter located in Florida. Management sever 410 may be located at one of the availability zones, or at a separate location. Each zone may include an internal network that interfaces with devices that are outside of the zone, such as the management server 410, through a gateway. End users of the cloud (e.g., clients 411-414) might or might not be aware of the distinctions between zones. For example, an end user may request the creation of a virtual machine having a specified amount of memory, processing power, and network capabilities. The management server 410 may respond to the user's request and may allocate the resources to create the virtual machine without the user knowing whether the virtual machine was created using resources from zone 401 or zone 402. In other examples, the cloud system may allow end users to request that virtual machines (or other cloud resources) are allocated in a specific zone or on specific resources 403-405 within a zone.

In this example, each zone 401-402 may include an arrangement of various physical hardware components (or computing resources) 403-405, for example, physical hosting resources (or processing resources), physical network resources, physical storage resources, switches, and additional hardware resources that may be used to provide cloud computing services to customers. The physical hosting resources in a cloud zone 401-402 may include one or more computer servers 403, such as the virtualization servers 301 described above, which may be configured to create and host virtual machine instances. The physical network resources in a cloud zone 401 or 402 may include one or more network elements 405 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 401-402 may include storage disks (e.g., solid state drives (SSDs), magnetic hard disks, etc.) and other storage devices.

The example cloud computing environment shown in FIG. 4 also may include a virtualization layer (e.g., as shown in FIGS. 1-3) with additional hardware and/or software resources configured to create and manage virtual machines and provide other services to customers using the physical resources in the cloud. The virtualization layer may include hypervisors, as described above in FIG. 3, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 403 with the physical computing resources. Known cloud systems may alternatively be used, e.g., WINDOWS AZURE (Microsoft Corporation of Redmond Wash.), AMAZON EC2 (Amazon.com Inc. of Seattle, Wash.), IBM BLUE CLOUD (IBM Corporation of Armonk, N.Y.), or others.

Enterprise Mobility Management Architecture

Figure 5:
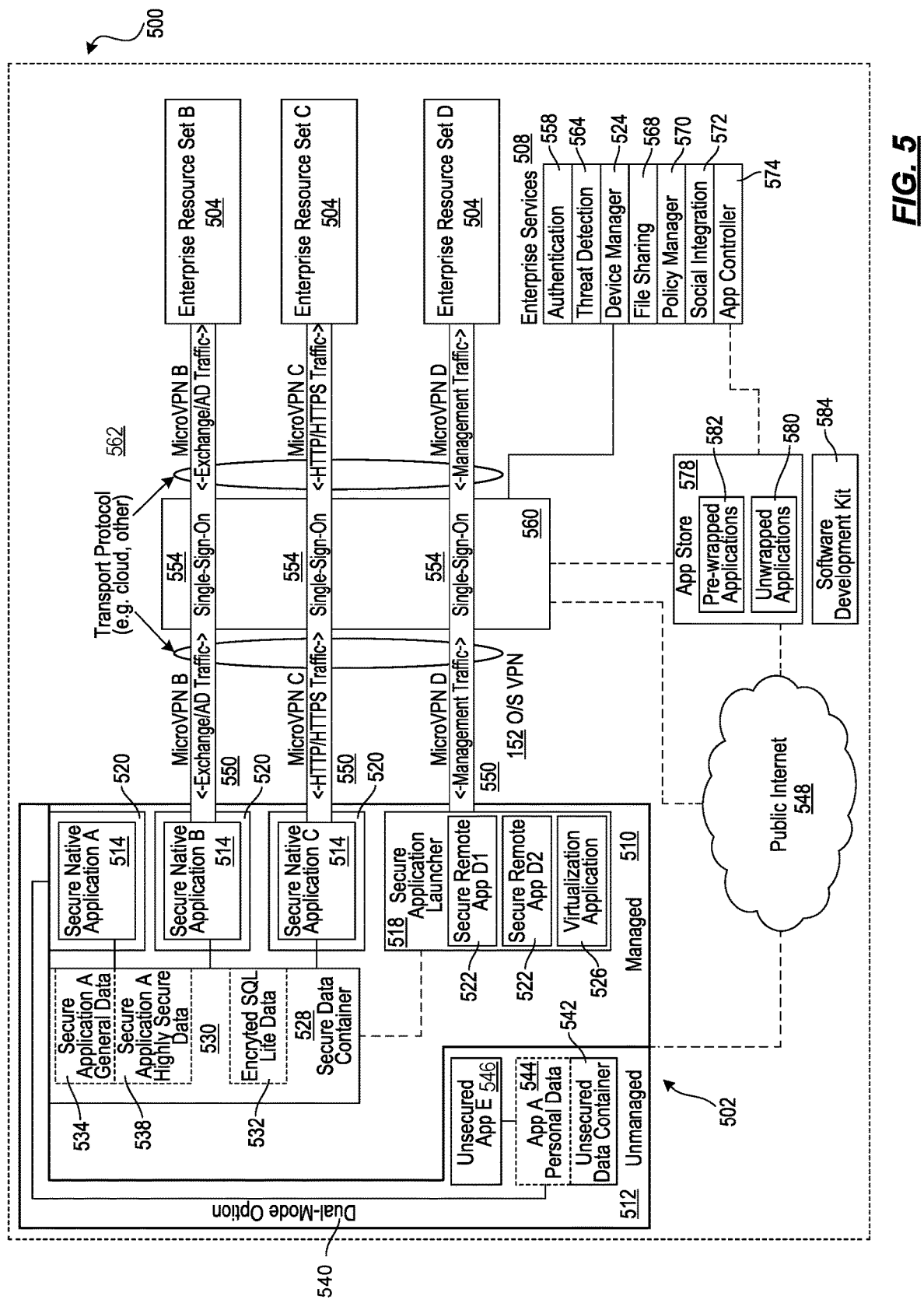
FIG. 5 depicts an illustrative enterprise mobility management system.

FIG. 5 represents an enterprise mobility technical architecture 500 for use in a BYOD environment. The architecture enables a user of a mobile device 502 to both access enterprise or personal resources from a mobile device 502 and use the mobile device 502 for personal use. The user may access such enterprise resources 504 or enterprise services 508 using a mobile device 502 that is purchased by the user or a mobile device 502 that is provided by the enterprise to user. The user may utilize the mobile device 502 for business use only or for business and personal use. The mobile device may run an iOS operating system, and Android operating system, or the like. The enterprise may choose to implement policies to manage the mobile device 504. The policies may be implanted through a firewall or gateway in such a way that the mobile device may be identified, secured or security verified, and provided selective or full access to the enterprise resources. The policies may be mobile device management policies, mobile application management policies, mobile data management policies, or some combination of mobile device, application, and data management policies. A mobile device 504 that is managed through the application of mobile device management policies may be referred to as an enrolled device.

In some embodiments, the operating system of the mobile device may be separated into a managed partition 510 and an unmanaged partition 512. The managed partition 510 may have policies applied to it to secure the applications running on and data stored in the managed partition. The applications running on the managed partition may be secure applications. In other embodiments, all applications may execute in accordance with a set of one or more policy files received separate from the application, and which define one or more security parameters, features, resource restrictions, and/or other access controls that are enforced by the mobile device management system when that application is executing on the device. By operating in accordance with their respective policy file(s), each application may be allowed or restricted from communications with one or more other applications and/or resources, thereby creating a virtual partition. Thus, as used herein, a partition may refer to a physically partitioned portion of memory (physical partition), a logically partitioned portion of memory (logical partition), and/or a virtual partition created as a result of enforcement of one or more policies and/or policy files across multiple apps as described herein (virtual partition). Stated differently, by enforcing policies on managed apps, those apps may be restricted to only be able to communicate with other managed apps and trusted enterprise resources, thereby creating a virtual partition that is not accessible by unmanaged apps and devices.

The secure applications may be email applications, web browsing applications, software-as-a-service (SaaS) access applications, Windows Application access applications, and the like. The secure applications may be secure native applications 514, secure remote applications 522 executed by a secure application launcher 518, virtualization applications 526 executed by a secure application launcher 518, and the like. The secure native applications 514 may be wrapped by a secure application wrapper 520. The secure application wrapper 520 may include integrated policies that are executed on the mobile device 502 when the secure native application is executed on the device. The secure application wrapper 520 may include meta-data that points the secure native application 514 running on the mobile device 502 to the resources hosted at the enterprise that the secure native application 514 may require to complete the task requested upon execution of the secure native application 514. The secure remote applications 522 executed by a secure application launcher 518 may be executed within the secure application launcher application 518. The virtualization applications 526 executed by a secure application launcher 518 may utilize resources on the mobile device 502, at the enterprise resources 504, and the like. The resources used on the mobile device 502 by the virtualization applications 526 executed by a secure application launcher 518 may include user interaction resources, processing resources, and the like. The user interaction resources may be used to collect and transmit keyboard input, mouse input, camera input, tactile input, audio input, visual input, gesture input, and the like. The processing resources may be used to present a user interface, process data received from the enterprise resources 504, and the like. The resources used at the enterprise resources 504 by the virtualization applications 526 executed by a secure application launcher 518 may include user interface generation resources, processing resources, and the like. The user interface generation resources may be used to assemble a user interface, modify a user interface, refresh a user interface, and the like. The processing resources may be used to create information, read information, update information, delete information, and the like. For example, the virtualization application may record user interactions associated with a graphical user interface (GUI) and communicate them to a server application where the server application may use the user interaction data as an input to the application operating on the server. In this arrangement, an enterprise may elect to maintain the application on the server side as well as data, files, etc. associated with the application. While an enterprise may elect to "mobilize" some applications in accordance with the principles herein by securing them for deployment on the mobile device, this arrangement may also be elected for certain applications. For example, while some applications may be secured for use on the mobile device, others might not be prepared or appropriate for deployment on the mobile device so the enterprise may elect to provide the mobile user access to the unprepared applications through virtualization techniques. As another example, the enterprise may have large complex applications with large and complex data sets (e.g., material resource planning applications) where it would be very difficult, or otherwise undesirable, to customize the application for the mobile device so the enterprise may elect to provide access to the application through virtualization techniques. As yet another example, the enterprise may have an application that maintains highly secured data (e.g., human resources data, customer data, engineering data) that may be deemed by the enterprise as too sensitive for even the secured mobile environment so the enterprise may elect to use virtualization techniques to permit mobile access to such applications and data. An enterprise may elect to provide both fully secured and fully functional applications on the mobile device as well as a virtualization application to allow access to applications that are deemed more properly operated on the server side. In an embodiment, the virtualization application may store some data, files, etc. on the mobile phone in one of the secure storage locations. An enterprise, for example, may elect to allow certain information to be stored on the phone while not permitting other information.

In connection with the virtualization application, as described herein, the mobile device may have a virtualization application that is designed to present GUIs and then record user interactions with the GUI. The application may communicate the user interactions to the server side to be used by the server side application as user interactions with the application. In response, the application on the server side may transmit back to the mobile device a new GUI. For example, the new GUI may be a static page, a dynamic page, an animation, or the like, thereby providing access to remotely located resources.

The secure applications may access data stored in a secure data container 528 in the managed partition 510 of the mobile device. The data secured in the secure data container may be accessed by the secure wrapped applications 514, applications executed by a secure application launcher 522, virtualization applications 526 executed by a secure application launcher 522, and the like. The data stored in the secure data container 528 may include files, databases, and the like. The data stored in the secure data container 528 may include data restricted to a specific secure application 530, shared among secure applications 532, and the like. Data restricted to a secure application may include secure general data 534 and highly secure data 538. Secure general data may use a strong form of encryption such as Advanced Encryption Standard (AES) 128-bit encryption or the like, while highly secure data 538 may use a very strong form of encryption such as AES 256-bit encryption. Data stored in the secure data container 528 may be deleted from the device upon receipt of a command from the device manager 524. The secure applications may have a dual-mode option 540. The dual mode option 540 may present the user with an option to operate the secured application in an unsecured or unmanaged mode. In an unsecured or unmanaged mode, the secure applications may access data stored in an unsecured data container 542 on the unmanaged partition 512 of the mobile device 502. The data stored in an unsecured data container may be personal data 544. The data stored in an unsecured data container 542 may also be accessed by unsecured applications 548 that are running on the unmanaged partition 512 of the mobile device 502. The data stored in an unsecured data container 542 may remain on the mobile device 502 when the data stored in the secure data container 528 is deleted from the mobile device 502. An enterprise may want to delete from the mobile device selected or all data, files, and/or applications owned, licensed or controlled by the enterprise (enterprise data) while leaving or otherwise preserving personal data, files, and/or applications owned, licensed or controlled by the user (personal data). This operation may be referred to as a selective wipe. With the enterprise and personal data arranged in accordance to the aspects described herein, an enterprise may perform a selective wipe.

The mobile device 502 may connect to enterprise resources 504 and enterprise services 508 at an enterprise, to the public Internet 548, and the like. The mobile device may connect to enterprise resources 504 and enterprise services 508 through virtual private network connections. The virtual private network connections, also referred to as microVPN or application-specific VPN, may be specific to particular applications (e.g., as illustrated by microVPNs 550), particular devices, particular secured areas on the mobile device (e.g., as illustrated by O/S VPN 552), and the like. For example, each of the wrapped applications in the secured area of the phone may access enterprise resources through an application specific VPN such that access to the VPN would be granted based on attributes associated with the application, possibly in conjunction with user or device attribute information. The virtual private network connections may carry Microsoft Exchange traffic, Microsoft Active Directory traffic, HyperText Transfer Protocol (HTTP) traffic, HyperText Transfer Protocol Secure (HTTPS) traffic, application management traffic, and the like. The virtual private network connections may support and enable single-sign-on authentication processes 554. The single-sign-on processes may allow a user to provide a single set of authentication credentials, which are then verified by an authentication service 558. The authentication service 558 may then grant to the user access to multiple enterprise resources 504, without requiring the user to provide authentication credentials to each individual enterprise resource 504.

The virtual private network connections may be established and managed by an access gateway 560. The access gateway 560 may include performance enhancement features that manage, accelerate, and improve the delivery of enterprise resources 504 to the mobile device 502. The access gateway may also re-route traffic from the mobile device 502 to the public Internet 548, enabling the mobile device 502 to access publicly available and unsecured applications that run on the public Internet 548. The mobile device may connect to the access gateway via a transport network 562. The transport network 562 may use one or more transport protocols and may be a wired network, wireless network, cloud network, local area network, metropolitan area network, wide area network, public network, private network, and the like.

The enterprise resources 504 may include email servers, file sharing servers, SaaS applications, Web application servers, Windows application servers, and the like. Email servers may include Exchange servers, Lotus Notes servers, and the like. File sharing servers may include ShareFile servers, and the like. SaaS applications may include Salesforce, and the like. Windows application servers may include any application server that is built to provide applications that are intended to run on a local Windows operating system, and the like. The enterprise resources 504 may be premise-based resources, cloud based resources, and the like. The enterprise resources 504 may be accessed by the mobile device 502 directly or through the access gateway 560. The enterprise resources 504 may be accessed by the mobile device 502 via a transport network 562. The transport network 562 may be a wired network, wireless network, cloud network, local area network, metropolitan area network, wide area network, public network, private network, and the like.

The enterprise services 508 may include authentication services 558, threat detection services 564, device manager services 524, file sharing services 568, policy manager services 570, social integration services 572, application controller services 574, and the like. Authentication services 558 may include user authentication services, device authentication services, application authentication services, data authentication services and the like. Authentication services 558 may use certificates. The certificates may be stored on the mobile device 502, by the enterprise resources 504, and the like. The certificates stored on the mobile device 502 may be stored in an encrypted location on the mobile device, the certificate may be temporarily stored on the mobile device 502 for use at the time of authentication, and the like. Threat detection services 564 may include intrusion detection services, unauthorized access attempt detection services, and the like. Unauthorized access attempt detection services may include unauthorized attempts to access devices, applications, data, and the like. Device management services 524 may include configuration, provisioning, security, support, monitoring, reporting, and decommissioning services. File sharing services 568 may include file management services, file storage services, file collaboration services, and the like. Policy manager services 570 may include device policy manager services, application policy manager services, data policy manager services, and the like. Social integration services 572 may include contact integration services, collaboration services, integration with social networks such as Facebook, Twitter, and LinkedIn, and the like. Application controller services 574 may include management services, provisioning services, deployment services, assignment services, revocation services, wrapping services, and the like.

The enterprise mobility technical architecture 500 may include an application store 578. The application store 578 may include unwrapped applications 580, pre-wrapped applications 582, and the like. Applications may be populated in the application store 578 from the application controller 574. The application store 578 may be accessed by the mobile device 502 through the access gateway 560, through the public Internet 548, or the like. The application store may be provided with an intuitive and easy to use User Interface.

A software development kit 584 may provide a user the capability to secure applications selected by the user by wrapping the application as described previously in this description. An application that has been wrapped using the software development kit 584 may then be made available to the mobile device 502 by populating it in the application store 578 using the application controller 574.

The enterprise mobility technical architecture 500 may include a management and analytics capability. The management and analytics capability may provide information related to how resources are used, how often resources are used, and the like. Resources may include devices, applications, data, and the like. How resources are used may include which devices download which applications, which applications access which data, and the like. How often resources are used may include how often an application has been downloaded, how many times a specific set of data has been accessed by an application, and the like.

Figure 6:
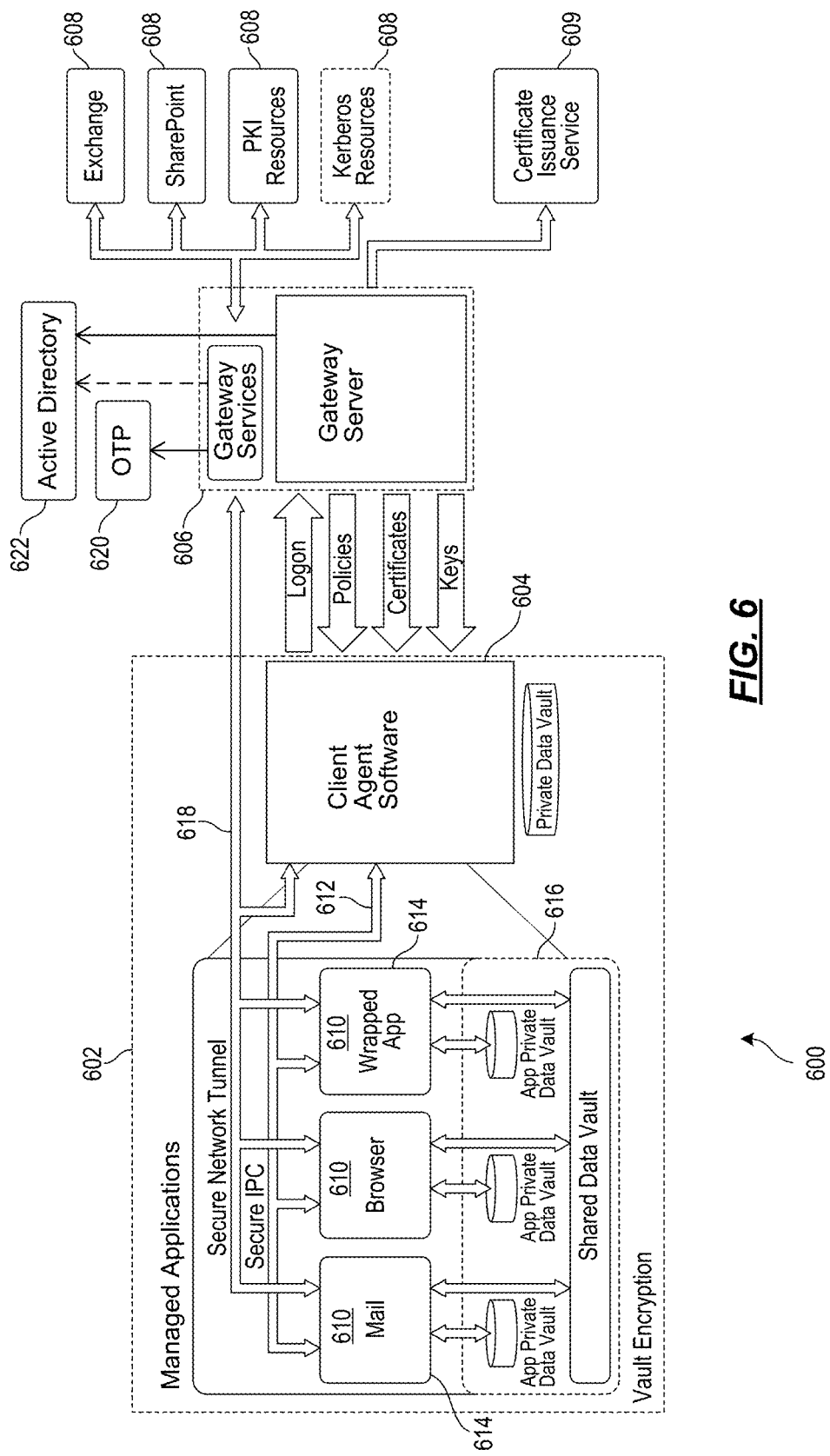
FIG. 6 depicts another illustrative enterprise mobility management system.

FIG. 6 is another illustrative enterprise mobility management system 600. Some of the components of the mobility management system 500 described above with reference to FIG. 5 have been omitted for the sake of simplicity. The architecture of the system 600 depicted in FIG. 6 is similar in many respects to the architecture of the system 500 described above with reference to FIG. 5 and may include additional features not mentioned above.

In this case, the left hand side represents an enrolled mobile device 602 with a client agent 604, which interacts with gateway server 606 (which includes Access Gateway and application controller functionality) to access various enterprise resources 608 and services 609 such as Exchange, Sharepoint, public-key infrastructure (PKI) Resources, Kerberos Resources, Certificate Issuance service, as shown on the right hand side above. Although not specifically shown, the mobile device 602 may also interact with an enterprise application store (StoreFront) for the selection and downloading of applications.

The client agent 604 acts as the UI (user interface) intermediary for Windows apps/desktops hosted in an Enterprise data center, which are accessed using the High-Definition User Experience (HDX)/ICA display remoting protocol. The client agent 604 also supports the installation and management of native applications on the mobile device 602, such as native iOS or Android applications. For example, the managed applications 610 (mail, browser, wrapped application) shown in the figure above are all native applications that execute locally on the device. Client agent 604 and application management framework of this architecture act to provide policy driven management capabilities and features such as connectivity and SSO (single sign on) to enterprise resources/services 608. The client agent 604 handles primary user authentication to the enterprise, normally to Access Gateway (AG) with SSO to other gateway server components. The client agent 604 obtains policies from gateway server 606 to control the behavior of the managed applications 610 on the mobile device 602.

The Secure interprocess communication (IPC) links 612 between the native applications 610 and client agent 604 represent a management channel, which allows client agent to supply policies to be enforced by the application management framework 614 "wrapping" each application. The IPC channel 612 also allows client agent 604 to supply credential and authentication information that enables connectivity and SSO to enterprise resources 608. Finally the IPC channel 612 allows the application management framework 614 to invoke user interface functions implemented by client agent 604, such as online and offline authentication.

Communications between the client agent 604 and gateway server 606 are essentially an extension of the management channel from the application management framework 614 wrapping each native managed application 610. The application management framework 614 requests policy information from client agent 604, which in turn requests it from gateway server 606. The application management framework 614 requests authentication, and client agent 604 logs into the gateway services part of gateway server 606 (also known as NetScaler Access Gateway). Client agent 604 may also call supporting services on gateway server 606, which may produce input material to derive encryption keys for the local data vaults 616, or provide client certificates which may enable direct authentication to PKI protected resources, as more fully explained below.

In more detail, the application management framework 614 "wraps" each managed application 610. This may be incorporated via an explicit build step, or via a post-build processing step. The application management framework 614 may "pair" with client agent 604 on first launch of an application 610 to initialize the Secure IPC channel and obtain the policy for that application. The application management framework 614 may enforce relevant portions of the policy that apply locally, such as the client agent login dependencies and some of the containment policies that restrict how local OS services may be used, or how they may interact with the application 610.

The application management framework 614 may use services provided by client agent 604 over the Secure IPC channel 612 to facilitate authentication and internal network access. Key management for the private and shared data vaults 616 (containers) may be also managed by appropriate interactions between the managed applications 610 and client agent 604. Vaults 616 may be available only after online authentication, or may be made available after offline authentication if allowed by policy. First use of vaults 616 may require online authentication, and offline access may be limited to at most the policy refresh period before online authentication is again required.

Network access to internal resources may occur directly from individual managed applications 610 through Access Gateway 606. The application management framework 614 is responsible for orchestrating the network access on behalf of each application 610. Client agent 604 may facilitate these network connections by providing suitable time limited secondary credentials obtained following online authentication. Multiple modes of network connection may be used, such as reverse web proxy connections and end-to-end VPN-style tunnels 618.

The Mail and Browser managed applications 610 have special status and may make use of facilities that might not be generally available to arbitrary wrapped applications. For example, the Mail application may use a special background network access mechanism that allows it to access Exchange over an extended period of time without requiring a full AG logon. The Browser application may use multiple private data vaults to segregate different kinds of data.

This architecture supports the incorporation of various other security features. For example, gateway server 606 (including its gateway services) in some cases might not need to validate active directory (AD) passwords. It can be left to the discretion of an enterprise whether an AD password is used as an authentication factor for some users in some situations. Different authentication methods may be used if a user is online or offline (i.e., connected or not connected to a network).

Step up authentication is a feature wherein gateway server 606 may identify managed native applications 610 that are allowed to have access to more sensitive data using strong authentication, and ensure that access to these applications is only permitted after performing appropriate authentication, even if this means a re-authentication is requested from the user after a prior weaker level of login.

Another security feature of this solution is the encryption of the data vaults 616 (containers) on the mobile device 602. The vaults 616 may be encrypted so that all on-device data including files, databases, and configurations are protected. For on-line vaults, the keys may be stored on the server (gateway server 606), and for off-line vaults, a local copy of the keys may be protected by a user password or biometric validation. When data is stored locally on the device 602 in the secure container 616, it is preferred that a minimum of AES 256 encryption algorithm be utilized.

Other secure container features may also be implemented. For example, a logging feature may be included, wherein all security events happening inside an application 610 are logged and reported to the backend. Data wiping may be supported, such as if the application 610 detects tampering, associated encryption keys may be written over with random data, leaving no hint on the file system that user data was destroyed. Screenshot protection is another feature, where an application may prevent any data from being stored in screenshots. For example, the key window's hidden property may be set to YES. This may cause whatever content is currently displayed on the screen to be hidden, resulting in a blank screenshot where any content would normally reside.

Local data transfer may be prevented, such as by preventing any data from being locally transferred outside the application container, e.g., by copying it or sending it to an external application. A keyboard cache feature may operate to disable the autocorrect functionality for sensitive text fields. SSL certificate validation may be operable so the application specifically validates the server SSL certificate instead of it being stored in the keychain. An encryption key generation feature may be used such that the key used to encrypt data on the device is generated using a passphrase or biometric data supplied by the user (if offline access is required). It may be XORed with another key randomly generated and stored on the server side if offline access is not required. Key Derivation functions may operate such that keys generated from the user password use KDFs (key derivation functions, notably Password-Based Key Derivation Function 2 (PBKDF2)) rather than creating a cryptographic hash of it. The latter makes a key susceptible to brute force or dictionary attacks.

Further, one or more initialization vectors may be used in encryption methods. An initialization vector might cause multiple copies of the same encrypted data to yield different cipher text output, preventing both replay and cryptanalytic attacks. This may also prevent an attacker from decrypting any data even with a stolen encryption key. Further, authentication then decryption may be used, wherein application data is decrypted only after the user has authenticated within the application. Another feature may relate to sensitive data in memory, which may be kept in memory (and not in disk) only when it's needed. For example, login credentials may be wiped from memory after login, and encryption keys and other data inside objective-C instance variables are not stored, as they may be easily referenced. Instead, memory may be manually allocated for these.

An inactivity timeout may be implemented, wherein after a policy-defined period of inactivity, a user session is terminated.

Data leakage from the application management framework 614 may be prevented in other ways. For example, when an application 610 is put in the background, the memory may be cleared after a predetermined (configurable) time period. When backgrounded, a snapshot may be taken of the last displayed screen of the application to fasten the foregrounding process. The screenshot may contain confidential data and hence should be cleared.

Another security feature relates to the use of an OTP (one time password) 620 without the use of an AD (active directory) 622 password for access to one or more applications. In some cases, some users do not know (or are not permitted to know) their AD password, so these users may authenticate using an OTP 620 such as by using a hardware OTP system like SecurID (OTPs may be provided by different vendors also, such as Entrust or Gemalto). In some cases, after a user authenticates with a user ID, a text is sent to the user with an OTP 620. In some cases, this may be implemented only for online use, with a prompt being a single field.

An offline password may be implemented for offline authentication for those applications 610 for which offline use is permitted via enterprise policy. For example, an enterprise may want StoreFront to be accessed in this manner. In this case, the client agent 604 may require the user to set a custom offline password and the AD password is not used. Gateway server 606 may provide policies to control and enforce password standards with respect to the minimum length, character class composition, and age of passwords, such as described by the standard Windows Server password complexity requirements, although these requirements may be modified.

Another feature relates to the enablement of a client side certificate for certain applications 610 as secondary credentials (for the purpose of accessing PKI protected web resources via the application management framework micro VPN feature). For example, an application may utilize such a certificate. In this case, certificate-based authentication using ActiveSync protocol may be supported, wherein a certificate from the client agent 604 may be retrieved by gateway server 606 and used in a keychain. Each managed application may have one associated client certificate, identified by a label that is defined in gateway server 606.

Gateway server 606 may interact with an Enterprise special purpose web service to support the issuance of client certificates to allow relevant managed applications to authenticate to internal PKI protected resources.

The client agent 604 and the application management framework 614 may be enhanced to support obtaining and using client certificates for authentication to internal PKI protected network resources. More than one certificate may be supported, such as to match various levels of security and/or separation requirements. The certificates may be used by the Mail and Browser managed applications, and ultimately by arbitrary wrapped applications (provided those applications use web service style communication patterns where it is reasonable for the application management framework to mediate https requests).

Application management client certificate support on iOS may rely on importing a public-key cryptography standards (PKCS) 12 BLOB (Binary Large Object) into the iOS keychain in each managed application for each period of use. Application management framework client certificate support may use a HTTPS implementation with private in-memory key storage. The client certificate might never be present in the iOS keychain and might not be persisted except potentially in "online-only" data value that is strongly protected.

Mutual SSL or TLS may also be implemented to provide additional security by requiring that a mobile device 602 is authenticated to the enterprise, and vice versa. Virtual smart cards for authentication to gateway server 606 may also be implemented.

Both limited and full Kerberos support may be additional features. The full support feature relates to an ability to do full Kerberos login to Active Directory (AD) 622, using an AD password or trusted client certificate, and obtain Kerberos service tickets to respond to HTTP Negotiate authentication challenges. The limited support feature relates to constrained delegation in Citrix Access Gateway Enterprise Edition (AGEE), where AGEE supports invoking Kerberos protocol transition so it can obtain and use Kerberos service tickets (subject to constrained delegation) in response to HTTP Negotiate authentication challenges. This mechanism works in reverse web proxy (aka corporate virtual private network (CVPN)) mode, and when http (but not https) connections are proxied in VPN and MicroVPN mode.

Another feature relates to application container locking and wiping, which may automatically occur upon jail-break or rooting detections, and occur as a pushed command from administration console, and may include a remote wipe functionality even when an application 610 is not running.

A multi-site architecture or configuration of enterprise application store and an application controller may be supported that allows users to be service from one of several different locations in case of failure.

In some cases, managed applications 610 may be allowed to access a certificate and private key via an API (example OpenSSL). Trusted managed applications 610 of an enterprise may be allowed to perform specific Public Key operations with an application's client certificate and private key. Various use cases may be identified and treated accordingly, such as when an application behaves like a browser and no certificate access is used, when an application reads a certificate for "who am I," when an application uses the certificate to build a secure session token, and when an application uses private keys for digital signing of important data (e.g. transaction log) or for temporary data encryption.

Illustrative Examples of Connecting Client Device(S) to Anonymous Session(S) Via Helper(S)

Figure 7:
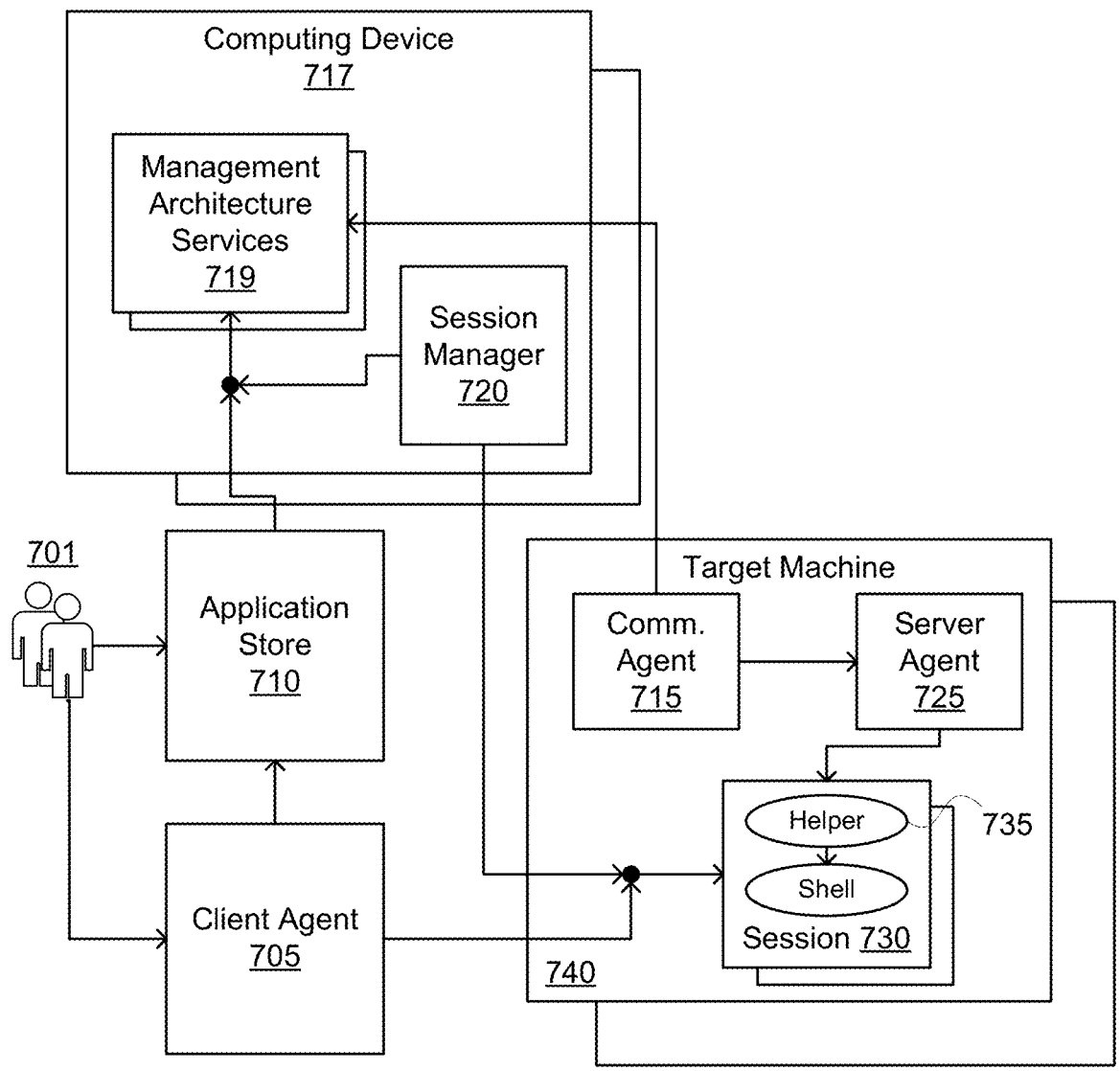
FIG. 7 depicts an illustrative system and method for connecting client devices to anonymous sessions via helpers in accordance with one or more illustrative aspects described herein.

FIG. 7 depicts an illustrative system and method for connecting client devices to anonymous sessions via helpers in accordance with one or more illustrative aspects described herein. The system may comprise a computing device 717 (and other computing devices). The computing device 717 may act, for example, as a controller to facilitate the creation and assignment of sessions on virtual machines. The computing device 717 may comprise a session manager 720. As will be described in further detail below, the session manager 720 may, for example, determine whether to generate anonymous session(s) and/or where (e.g., which virtual machine) to generate the anonymous session(s). The computing device 717 may comprise management architecture services 719, which may comprise microservices running on the computing device 717. For example, management architecture services 719 may comprise a broker service. As will be described in further detail below, the management architecture services 719 may identify and/or manage sessions that are in use. A database (not shown) may maintain the states of one or more sessions on target machines, and the computing device 717 (e.g., via the session manager 720) may consult the database to determine, for example, the number of sessions that are in use or available. The database may be shared by other computing devices (not shown), and the other computing devices may similarly consult the database to determine the number of sessions that are in use or available.

The system may comprise one or more client devices 701, and each client device may run an associated client agent 705. The client agent 705 may facilitate connecting the client device to a session, such as an anonymous session, so that the client device can access one or more resources (e.g., virtual applications and/or desktops). The system may comprise an application store 710. As will be described in further detail below, the application store 710 may be used to generate one or more anonymous sessions and/or to provide configuration information for those anonymous sessions. The application store 710 may also facilitate connecting a client device to a particular session.

The system may comprise a target machine 740 (and other machines). Target machines may be used to run one or more sessions, some of which may be anonymous sessions and some of which may be user-specific sessions. For example, FIG. 7 illustrates a session 730, which may comprise an anonymous session. The session 730 may include a helper process 735 within the session. The helper 735 may be used to keep the session 730 alive when a client device has not yet connected to the session 730. The helper 735 may also facilitate conversion of the session 730 from an anonymous session to a user-specific session, as will be described in further detail below. The target machine 740 may comprise a communication agent 715 (e.g., a brokering agent) used to facilitate communications between the target machine 740 and the computing device 717, client devices, and/or other devices. The target machine 740 may comprise a server agent 725, which may facilitate creation and management of sessions on the target machine 740.

FIG. 8 depicts an illustrative system and method for connecting client devices to anonymous sessions via helpers in accordance with one or more illustrative aspects described herein. In step 806, a computing device 717, such as via the session manager 720, may determine whether to generate a session, such as an anonymous session. The session manager 720 may transmit, to the management services 719, a query to determine the number and/or types of sessions in a pool of sessions. The pool of sessions may be running on one or more virtual machines, such as target machine 740. The management services 719 may know which sessions are being used and which users are using those sessions. The management services 719 may also know which sessions in the pool of sessions are anonymous sessions available for use by client devices. For example, the management services 719 may access a database to determine which sessions are being used, which users are using those sessions, and/or which sessions in the pool of sessions are anonymous sessions available for use by client devices. The session manager 720 may receive, from the management services 719, information indicating the number and/or types of anonymous sessions available for use by client devices. The session manager 720 may determine whether to generate an anonymous session based on, for example, a determination that a number of anonymous sessions in the pool of anonymous sessions is below a threshold number of anonymous sessions. For example, the session manager 720 may attempt to maintain a particular number of sessions in the pool. If the session manager 720 determines not to generate an anonymous session, the session manager 720 may wait and query the management services 719 at a later time to again determine whether to generate an anonymous session. If, on the other hand, the session manager 720 determines to generate an anonymous session, the session manager 720 may proceed to step 810.

In step 810, the session manager 720 may transmit, to the application store 710, a request to generate a session. The request may indicate that the session is to be an anonymous session. Based on this indication, subsequent components handling the request (e.g., the communication agent 715, the server agent 725, etc.) may know that the session is to be an anonymous session.

In step 814, the application store 710 may transmit, to the management services 719, a request to launch an anonymous session. The management services 719 (e.g., via a broker service) may determine the target machine 740 (or other location) on which to generate the session. The determination may be based on, for example, load balancing, readiness to respond to the request, etc. In step 818, the management services 719 may transmit, to the communication agent 715 of the target machine 740, a message to prepare to generate an anonymous session. The prepare message may be transmitted in response to the launch session request (e.g., step 814). In step 822, the management services 719 may acknowledge, to the application store 710, the request to launch an anonymous session.

In step 826, the application store 710 may transmit, to the session manager 720, configuration information for generating the anonymous session. The session manager 720 may receive the configuration information based on its request (e.g., transmitted in step 810). In some examples, the application store 710 may generate the configuration information. The configuration information may comprise information, such as the address (or other identifier) of the target machine 740 on which to generate the anonymous session. The configuration information may indicate the type of session (e.g., a virtual desktop or a virtual application). The configuration information may be included in, for example, an ICA file transmitted to the session manager 720.

In step 830, the session manager 720 may transmit, to the corresponding target machine 740, a request to generate (e.g., launch) an anonymous session, such as the anonymous session 730. For example, the session manager 720 may receive the configuration information from the application store 710, and based on the configuration information, the session manager 720 may transmit a request to initiate generation of the anonymous session on a target machine 740. The request to generate the anonymous session 730 may include a request to initiate an anonymous helper 735 associated with the anonymous session 730. The anonymous helper 735 may be a process running within the anonymous session 730. In some aspects, each anonymous session may have a corresponding helper.

The session manager 720 may also connect to the anonymous session 730 on the target machine 740. The connection may comprise a display remoting protocol connection to the target machine 740, such as an HDX/ICA connection. By connecting to the anonymous session 730, the session manager 720 may effectively start the session 730.

In step 834, the session manager 720 may disconnect from the anonymous session 730, such as after a particular amount of time. By disconnecting from the anonymous session 730, the anonymous session 730 may be made available for use by other client devices. For example, the anonymous session 730 may enter a waiting period and sit dormant, waiting for a client device to connect to the session 730.

In step 838, the helper 735 may maintain the anonymous session 730. After initiating generation of the anonymous session 730 on the target machine 740, the anonymous helper may keep alive the anonymous session 730 on the target machine 740 for a period of time. For example, the operating system of the target machine 740 may report, to the server agent 725, that the helper 735 is running, so that the anonymous session 730 is maintained. Accordingly, the session 730 may be kept running so that a client device may quickly connect to the session 730. The anonymous helper 735 may keep the anonymous session 730 alive for a threshold amount of time. In some aspects, if a client device has not connected to the anonymous session 730 within the threshold amount of time, the anonymous session 730 may be removed from the target machine 740. Additionally or alternatively, the server agent 725 may automatically terminate sessions, such as when the last application process running them terminates. While the helper 735 keeps the anonymous session 730 alive, a client device may desire to connect to a session.

In step 840, a client device, such as via a client agent 705, may transmit, to the application store 710, a request to launch a session. For example, the application store 710 may receive, from the client device, a request to start an application or a desktop session. As will be described in further detail below, the client device requesting the application or desktop session may claim one of the existing anonymous sessions. In step 844, the application store may transmit the request to the management services 719.

In step 848, the management services 719 may send a prepare message (e.g., as a prepare call) to the communication agent 715 of a target machine 740. The message may indicate to the communication agent 715 to prepare to be connected to the client agent 705 of the client device. The management services 719 may determine a session for the client device, such as based on information received from the client agent 705. Information received from the client agent 705 may include, for example, user identity, user location, whether the request originates from an external network (e.g., via a gateway) or from a local network (e.g., a LAN), whether the client device has antivirus software installed, whether the client device has any application limits, etc. Based on the information received from the client agent 705, the management services 719 may determine whether there is a suitable anonymous session for the client device. Whether an anonymous session is suitable may be based on a policy decision or other factors.

There may be a plurality of pools of anonymous sessions, and each pool may have different characteristics. The management services 719 may direct the client agent to a virtual machine 740 and/or pool of anonymous sessions based on, for example, the user identity (e.g., whether the user has access to certain resources), user location, whether the request originates from an external network (e.g., via a gateway) or from a local network (e.g., a LAN), whether the client device has antivirus software installed, whether the client device has any application limits, or other information associated with the user. As another example, a pool of anonymous sessions may run on a different type of machine than another pool of anonymous sessions (e.g., 4 GB machine vs. 8 GB machine), and a policy decision may be used to determine whether to connect the client device to the 4 GB machine or the 8 GB machine. Different pools of anonymous sessions may support different types of applications, and the management services 719 may determine the pool of anonymous sessions to route the client device based on the application requested by the client device. For example, selecting the anonymous session on the target machine to connect the client device may be based on one or more of a location of the client device, an indication of a network that the client device is connected to, processor characteristics of the target machine, or memory characteristics of the target machine. In step 852, the management services 719 may acknowledge the request from the client agent 705 to launch a session.

In step 856, the application store 710 may transmit configuration information for the anonymous session to the client agent 705 of the client device. The client agent 705 may receive the configuration information based on its launch request (e.g., transmitted in step 840). The configuration information may comprise information, such as the address (or other identifier) of the target machine 740 on which the anonymous session exists. The configuration information may additionally or alternatively include one or more identifiers of the anonymous session. The configuration information may be included in, for example, an ICA file transmitted to the client agent 705.

In step 860, the client agent 705 may transmit a request to connect to the anonymous session 730. The connection may use the configuration information received from the application store 710 and/or management services 719. As previously explained, the connection may comprise a display remoting protocol connection to the target machine 740, such as HDX/ICA connection. The connection may comprise, for example, mouse, keyboard, and/or graphics connection(s). The connection may function as a reconnection because the client device may connect to the anonymous session 730 after the session manager 720 generated, connected, and disconnected from the anonymous session.

In step 864, the helper 735 may transmit, to the communication agent 715, a request to retrieve credentials and/or application details associated with the user of the client device. The helper 735 may be used to authenticate the client device. For example, the helper 735 may retrieve, from the communication agent 715, credentials associated with the user of the client device. Examples of user credentials include actual end user credentials (e.g., username and/or password, biometrics, or other unique identifiers), security tokens, single sign on credentials, pass credentials, and the like. The credentials may be transmitted to the virtual machine 740 running the chosen session 730 (e.g., via the helper 735), and the helper 735 may authenticate the user based on the credentials. Moreover, the user credentials may be supplied at connection or session unlock time, which may cause the credentials to be locally stored. The user may be authenticated using a domain-based network authentication, such as a challenge/response authentication protocol and/or Kerberos. Additionally or alternatively, the system may provide the user credentials linked to the anonymous session, so it may be readable by credential providers. Appropriate credential tiles may be displayed to unlock a locked session with the user credentials.

The helper 735 may also be used to convert the anonymous session 730 into a session customized for the client device. The helper 735 may associate user configuration parameters with the application on the target machine, based on information retrieved from a profile associated with the user. The profile may comprise personal settings (e.g., shortcuts, application profile, cookies, etc.) for application(s) and/or desktop(s) accessed by the client device. The helper 735 may use the information from the user's profile to customize the session 730 for the client device. The session 730 may be tagged as owned by the end user identity. Customizing the session 730 for the client device may comprise applying appropriate user policies to the session 730 and/or initiating a user-specific roaming profile to be associated with the session 730. The user may be granted access to appropriate elastic application layer disks. Logon scripts or registry run actions may be re-executed.

In step 868, the helper 735 may start the application 745. The helper 735 may impersonate the user based on the user's credentials and/or profile information. The helper 735 may use the credentials associated with the user to start the application on the target machine 740 as the user. Starting the application on the target machine 740 as the user may comprise associating, based on information retrieved from a profile associated with the user, user configuration parameters for the application on the target machine 740. The helper 735 may use a WINDOWS run as action to start the application 745. For example, a WINDOWS shell process in the session may be made to take the user credentials and/or token and use them to obtain a user token with which the run as action may be used to start the target application 745 as the desired end user. The client device, via the client agent 705, may be connected to the session 730 and the application 745. In some aspects, the end user might not know that an anonymous session was used to connect to the session 730 and application 745, and the process may be transparent to the end user.

In step 872, the helper process 735 associated with the session 730 may be ended, after starting the application 745 on the target machine 740 as the user. After ending the helper process, the session 730 might not be treated as an anonymous session. Rather, the session 730 may be treated as a session customized for the end user. The same or similar steps may be used to connect the client device to a virtual desktop. The client device may then access one or more resources associated with the application 745 and/or virtual desktop. At some point, the client device may disconnect from the session 730.

In step 880, the client device may be disconnected from the session 730. For example, the client agent 705 may transmit a request to disconnect from the session 730 after starting the application 745 on the target machine 740 as the user. The session 730 may receive the disconnect request from the client device.

In step 884, the session 730 may be disconnected and/or removed from the target machine 740, such as in response to receiving the request to disconnect. The session 730 may be terminated and/or cleaned when the end user disconnects from the session 730. Accordingly, once a session has been associated with (e.g., used by) a particular user, the session may leave the pool of anonymous sessions, and other user's might not be able to use the session. The user's data, configurations, or other information may be kept secure by preventing other users from using the session 730 once it has been customized for the user. As previously explained, other anonymous sessions may be created to facilitate quick access to virtual applications and/or desktops.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method comprising:
    sending, by a computing device to a server, a request to generate an anonymous session;
    based on the request, receiving, by the computing device from the server, configuration information of a target machine for generating the anonymous session, wherein the configuration information comprises at least one of an address of the target machine or a type of the anonymous session;
    based on the configuration information, sending, by the computing device to the target machine, a request to initiate generation of the anonymous session on the target machine, wherein the request to initiate generation of the anonymous session includes a request to initiate an anonymous helper associated with the anonymous session;
    receiving, from a client device, a request to start an application; and
    based on receiving the request to start the application, causing the client device to connect to the anonymous session on the target machine, wherein the computing device is disconnected from the anonymous session before the client device connects to the anonymous session
    wherein a plurality of anonymous sessions, including the anonymous session, are on the target machine, wherein each of the plurality of anonymous sessions is associated
    with a respective anonymous helper, and wherein the causing the client device to connect to the anonymous session on the target machine is based on one or more of a location of the client device, an indication of a network that the client device is connected to, processor characteristics of the target machine, or memory characteristics of the target machine.

2. The method of claim 1, further comprising determining to generate the anonymous session based on a quantity of anonymous sessions in a pool of anonymous sessions being below a threshold quantity of anonymous sessions.

3. The method of claim 1, wherein the sending the request to initiate generation of the anonymous session on the target machine comprises:
    connecting, by the computing device, to the anonymous session on the target machine; and
    after an amount of time and before the causing the client device to connect to the anonymous session on the target machine, disconnecting the computing device from the anonymous session on the target machine.

4. The method of claim 1, further comprising:
    retrieving, by the anonymous helper associated with the anonymous session, a credential associated with a user of the client device;
    using, by the anonymous helper, the credential to start the application on the target machine; and
    associating, by the anonymous helper, based on a retrieved user profile, user configuration parameters with the application on the target machine.

5. The method of claim 1, further comprising based on the receiving the request:
    determining, by the computing device, the anonymous session from a pool of anonymous sessions based on information received from the client device, wherein the information comprises one or more of a user identity, a user location, a request origination network, an antivirus software installation, or an application limit associated with the client device.

6. The method of claim 1, further comprising based on the receiving the request:
    determining, by the computing device, an anonymous session based on a policy decision.

7. An apparatus comprising:
    one or more processors; and
    memory storing instructions that, when executed by the one or more processors, cause the apparatus to:
    send, to a server, a request to generate an anonymous session;
    based on the request, receive, from the server, configuration information of a target machine for generating the anonymous session, wherein the configuration information comprises at least one of an address of the target machine or a type of the anonymous session;
    based on the configuration information, send, to the target machine, a request to initiate generation of the anonymous session on the target machine, wherein the request to initiate generation of the anonymous session includes a request to initiate an anonymous helper associated with the anonymous session;
    receive, from a client device, a request to start an application; and
    based on receiving the request to start the application, cause the client device to connect to the anonymous session on the target machine, wherein the computing device is disconnected from the anonymous session before the client device connects to the anonymous session
    wherein a plurality of anonymous sessions, including the anonymous session, are on the target machine, wherein each of the plurality of anonymous sessions is associated with a respective anonymous helper, and wherein the causing the client device to connect to the anonymous session on the target machine is based on one or more of a location of the client device, an indication of a network that the client device is connected to, processor characteristics of the target machine, or memory characteristics of the target machine.

8. The apparatus of claim 7, wherein the instructions, when executed by the one or more processors, further cause the apparatus to determine to generate the anonymous session based on a quantity of anonymous sessions in a pool of anonymous sessions being below a threshold quantity of anonymous sessions.

9. The apparatus of claim 7, wherein the instructions, when executed by the one or more processors, cause the apparatus to send the request to initiate generation of the anonymous session on the target machine by:
    connecting to the anonymous session on the target machine; and
    after an amount of time and before the causing the client device to connect to the anonymous session on the target machine, disconnecting from the anonymous session on the target machine.

10. The apparatus of claim 7, wherein the instructions, when executed by the one or more processors, further cause the apparatus to:
    retrieve, by the anonymous helper associated with the anonymous session, a credential associated with a user of the client device;
    use, by the anonymous helper, the credential to start the application on the target machine; and
    associate, by the anonymous helper, based on a retrieved user profile, user configuration parameters with the application on the target machine.

11. A method comprising:
    receiving, by a computing device, a request to initiate an anonymous session and an anonymous helper associated with the anonymous session;
    in response to the request, initiating the anonymous session and the anonymous helper;
    receiving, from a client device, a request to connect to the anonymous session;
    in response to the request to connect to the anonymous session, establishing a connection between the client device and the anonymous session, wherein the computing
device is disconnected from the anonymous session before the client device connects to the anonymous session;
    retrieving, via the anonymous helper, a credential associated with a user of the client device; and
    starting, based on the credential associated with the user, an application
    wherein a plurality of anonymous sessions, including the anonymous session, are on the target machine, wherein each of the plurality of anonymous sessions is associated with a respective anonymous helper, and wherein the causing the client device to connect to the anonymous session on the target machine is based on one or more of a location of the client device, an indication of a network that the client device is connected to, processor characteristics of the target machine, or memory characteristics of the target machine.

12. The method of claim 11, wherein the connection comprises a display remoting protocol connection to the computing device.

13. The method of claim 11, wherein the receiving the request to initiate the anonymous session comprises receiving, from a session manager, the request to initiate the anonymous session, and
    wherein the method further comprises, after the initiating the anonymous session, disconnecting the session manager from the anonymous session.

14. The method of claim 11, wherein the anonymous helper comprises a process running within the anonymous session.

15. The method of claim 11, further comprising keeping alive, via the anonymous helper, the anonymous session for a period of time after the initiating the anonymous session and before the establishing the connection with the client device.

16. The method of claim 11, further comprising converting, via the anonymous helper, the anonymous session into a user-specific session customized for the client device.

17. The method of claim 11, further comprising authenticating, based on the credential, the user with the anonymous session.

18. The method of claim 11, wherein the starting the application comprises logging into the application as the user based on the credential to impersonate the user.

19. The method of claim 11, further comprising:
    after the starting the application, terminating the anonymous helper.

20. The method of claim 11, further comprising:
    after the starting the application, receiving, from the client device, a request to disconnect from the anonymous session; and
    in response to the request to disconnect, disconnecting the client device from the anonymous session and removing the anonymous session from the computing device.

21. The method of claim 11, wherein the starting the application comprises associating, based on a retrieved user profile, user configuration parameters with the application on the target machine.

* * * * *